(12) United States Patent
Edpalm et al.

(10) Patent No.: US 10,779,003 B2
(45) Date of Patent: Sep. 15, 2020

(54) METHOD AND SYSTEM FOR GENERATING AN EVENT VIDEO SEQUENCE, AND CAMERA COMPRISING SUCH SYSTEM

(71) Applicant: Axis AB, Lund (SE)

(72) Inventors: Viktor Edpalm, Lund (SE); Bjarne Rosengren, Södra Sandby (SE); Jonas Holmberg, Klagerup (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 46 days.

(21) Appl. No.: 15/071,654

(22) Filed: Mar. 16, 2016

(65) Prior Publication Data

US 2016/0277759 A1 Sep. 22, 2016

(30) Foreign Application Priority Data

Mar. 16, 2015 (EP) .................................... 15159174

(51) Int. Cl.
*H04N 19/57* (2014.01)
*H04N 19/114* (2014.01)
(Continued)

(52) U.S. Cl.
CPC ....... *H04N 19/57* (2014.11); *G08B 13/19667* (2013.01); *G08B 13/19669* (2013.01);
(Continued)

(58) Field of Classification Search
CPC ...... H04N 19/57; H04N 19/107; H04N 5/917; G08B 13/19676; G11B 27/031
(Continued)

(56) References Cited

U.S. PATENT DOCUMENTS

| 6,011,901 A | * | 1/2000 | Kirsten | ............ | G08B 13/19645 |
|---|---|---|---|---|---|
|  |  |  |  |  | 348/E7.086 |
| 2007/0055988 A1 | * | 3/2007 | Iwamura | ............. | H04L 12/2803 |
|  |  |  |  |  | 725/37 |

(Continued)

FOREIGN PATENT DOCUMENTS

| EP | 1 879 384 A1 | 1/2008 |
|---|---|---|
| JP | 2008-022556 A | 1/2008 |

(Continued)

OTHER PUBLICATIONS

EP 15 15 9174.0 European Search Report (dated Aug. 31, 2015).

*Primary Examiner* — Amir Shahnami
(74) *Attorney, Agent, or Firm* — Volpe and Koenig, P.C.

(57) ABSTRACT

A method, system, and non-transitory computer readable storage medium having instructions for generating an event video sequence. The method comprises receiving input image frames encoded into a sequence of image frames arranged in groups of pictures, each group of pictures having a GOP structure. The method further comprises storing a pre-event sequence of image frames in a first-in-first-out buffer, said pre-event sequence having a first predetermined GOP structure, upon receiving an event notification, retrieving the pre-event sequence from the buffer, and generating the event video sequence by combining the pre-event sequence and a post-event sequence of image frames, said post-event sequence having a second GOP structure, which is different from said first GOP structure. The system may be included in a camera.

8 Claims, 4 Drawing Sheets

(51) Int. Cl.

| | | |
|---|---|---|
| *H04N 19/177* | (2014.01) | |
| *G08B 13/196* | (2006.01) | |
| *H04N 19/152* | (2014.01) | |
| *H04N 7/18* | (2006.01) | |
| *G08B 25/08* | (2006.01) | |
| *H04N 19/107* | (2014.01) | |
| *H04N 19/137* | (2014.01) | |
| *H04N 19/162* | (2014.01) | |
| *H04N 19/433* | (2014.01) | |
| *H04N 19/44* | (2014.01) | |
| *H04N 19/46* | (2014.01) | |
| *H04N 19/593* | (2014.01) | |
| *H04N 5/917* | (2006.01) | |
| *G11B 27/031* | (2006.01) | |

(52) U.S. Cl.
CPC ....... *G08B 13/19676* (2013.01); *G08B 25/08* (2013.01); *H04N 5/917* (2013.01); *H04N 7/181* (2013.01); *H04N 19/107* (2014.11); *H04N 19/114* (2014.11); *H04N 19/137* (2014.11); *H04N 19/152* (2014.11); *H04N 19/162* (2014.11); *H04N 19/177* (2014.11); *H04N 19/433* (2014.11); *H04N 19/44* (2014.11); *H04N 19/46* (2014.11); *H04N 19/593* (2014.11); *G11B 27/031* (2013.01)

(58) Field of Classification Search
USPC .......................................... 375/240, 240.13
See application file for complete search history.

(56) References Cited

U.S. PATENT DOCUMENTS

| | | | | |
|---|---|---|---|---|
| 2008/0198268 | A1* | 8/2008 | Tullberg | H04N 5/23203 348/659 |
| 2009/0019476 | A1* | 1/2009 | Ohlfs | H04N 5/783 725/38 |
| 2010/0124274 | A1* | 5/2010 | Cheok | H04N 19/176 375/240.03 |
| 2010/0265344 | A1* | 10/2010 | Velarde | H04N 5/232 348/208.16 |
| 2011/0069757 | A1* | 3/2011 | Ammu | H04N 19/172 375/240.12 |
| 2012/0014659 | A1* | 1/2012 | Hugosson | G08B 13/19669 386/228 |

FOREIGN PATENT DOCUMENTS

| | | |
|---|---|---|
| TW | I430663 B | 3/2014 |
| WO | 2010/057170 A1 | 5/2010 |
| WO | 2014/001381 A2 | 1/2014 |

\* cited by examiner

METHOD AND SYSTEM FOR GENERATING AN EVENT VIDEO SEQUENCE, AND CAMERA COMPRISING SUCH SYSTEM

FIELD OF INVENTION

The present invention relates to the field of capturing video sequences, and more particularly to generating video sequences of encoded image frames.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by using spatial redundancy of the pixels in a given channel of a single frame via prediction, transform, and entropy coding. Thus, a macro block of pixels may be encoded with reference to another, similar macroblock in the same frame. The encoded frames are called intra-frames, and may also be referred to as I-frames. The inter mode instead exploits temporal redundancy between separate frames, and relies on a motion-compensation prediction technique that predicts parts of a frame from one or more other frames by encoding the motion in pixels from one frame to another for selected blocks of pixels. Thus, a macro block of pixels may be encoded with reference to another, similar macroblock in another, previously decoded frame. The encoded frames are called inter-frames, and may be referred to as P-frames (forward-predicted frames), which can refer to previous frames in decoding order, or B-frames (bi-directionally predicted frames), which can have any arbitrary display-order relationship of the frames used for the prediction, and which can refer to two or more previously decoded frames. Further, the encoded frames are arranged in groups of pictures, or GOPs, where each group of pictures is started with an I-frame, and the following frames are P-frames or B-frames. The structure of the groups of pictures may be called a GOP structure. One aspect of the GOP structure is the number of frames in a group of pictures, which is generally referred to as a GOP length. GOP lengths may vary from 1, meaning that there is just an intra-frame, and no inter-frames, in a group of pictures, to, e.g., 61,440, meaning that there is one intra-frame followed by 61,439 inter-frames in a group of pictures. Since intra-frames generally require more bits for representation of an image than inter-frames, motion video having longer GOP lengths will generally produce a lower output bit rate than motion video having shorter GOP lengths.

At the site of reception of the encoded video sequence, the encoded frames are decoded. A concern in network camera monitoring systems is the available bandwidth for transmission of encoded video. This is particularly true in systems employing a large number of cameras. Further, this concern is especially important in situations where available bandwidth is low, such as when the video sequence is to be transmitted to a mobile device, e.g., a mobile phone, a PDA, or a tablet computer. An analogous problem occurs regarding storage of images, for instance when storing images on an on-board SD card in the camera. A compromise has to be made, where available bandwidth or storage is balanced against the interest of high quality video images. A number of methods and systems have been used for controlling the encoding in order to reduce the bit rate of transmissions from the cameras. These known methods and systems generally apply a bit rate limit, and control the encoding such that the output bit rate from the cameras is always below the bit rate limit. In this way, it may be ensured that the available bandwidth is sufficient, such that all cameras in the system may transmit their video sequences to the site of reception, e.g., a control center, where an operator may monitor video from the cameras of the system, and where video may be recorded for later use. However, applying a bit rate limit to all cameras may lead to undesirably low image quality at times, since the bit rate limit may require severe compression of images containing a lot of details, regardless of what is happening in the monitored scene. Recently, it has been proposed to use various schemes altering the GOP structure for controlling the output bit rate. For instance, the GOP length may be varied, such that a longer GOP length is used when there is little or no motion in the monitored scene, thereby reducing the output bit rate, and decreasing the GOP length when there is motion in the scene, allowing higher quality images at the price of a higher bit rate.

Recording of video sequences, particularly in monitoring or surveillance applications, may be based on one or more event triggers, e.g., a motion detection event trigger. In this manner, recording may be initiated when an event occurs, such as when movement occurs in a previously static scene. When recording is based on event triggers, it is oftentimes useful to record also a pre-event video sequence. For instance, if recording is triggered by a person moving in a region of interest representing a part of the monitored scene, it may be of interest to record also a video sequence showing how a person moved into that part of the scene. Similarly, it is generally useful to record also a post-event sequence capturing what happens after the person has moved out of the region of interest. In order to be able to record a pre-event video sequence when an event occurs, image frames may be continuously buffered in a first-in-first-out buffer, also referred to as a FIFO buffer. When an event occurs, image frames are retrieved from the buffer, such that they may be recorded preceding a video sequence that starts at the event. Recording may then be continued a predetermined time after the event has passed. The length of time of the pre-event and post-event sequences may be set by a user.

However, if the GOP length is varied in order to control bit rate, it is not possible to ensure that the pre-event sequence is viewable. This is because decoding has to start at an intra-frame. Should the first image in the pre-event buffer be an inter-frame, the previous frame to which that inter-frame refers has been lost due to the FIFO principle used for the buffer. Depending on the GOP length used and the time set for the pre-event sequence, there may be an intra-frame in the pre-event buffer, but from a point in time closer to the event than the user desired. The likelihood of an intra-frame from sufficiently long before the event being present in the pre-event buffer may be increased by adding a predetermined safety period to the pre-event time set by the user, such that actually a few more seconds are stored in the pre-event buffer than the user has set as pre-event recording time. Still, this requires a large buffer, which will be unnecessarily large when a short GOP length is used. Further, if the GOP length is long, there may still not be room for a sufficient number of frames to ensure that there is an intra-frame in the buffer from before the set pre-event time. Hence, it may be seen that a need remains for an improved method of generating an event video sequence.

SUMMARY

It is an object of the present invention to provide a method of generating an event video sequence, which makes it possible to ensure that a pre-event video sequence of a desired length of time may be recorded or displayed even if a variable GOP length is employed. It is a further object to provide a method of generating an event video sequence which enables recording or display of a pre-event sequence also if the GOP structure is changed in other ways.

A further object of the invention is to provide a system for generating an event video sequence, which makes it possible to generate a video sequence comprising a pre-event sequence of a desired length of time even if a variable GOP structure, and more specifically a variable GOP length, is used.

According to a first aspect, these objects are achieved, in full or at least in part, by method of generating an event video sequence, the method comprising: receiving input image frames encoded into a sequence of image frames arranged in groups of pictures, each group of pictures comprising an intra-frame and zero or more subsequent inter-frames, each group of pictures in said sequence of image frames having a GOP structure, storing a pre-event sequence of image frames in a first-in-first-out buffer, said pre-event sequence having a first predetermined GOP structure, receiving an event notification, upon receiving said event notification, retrieving said pre-event sequence from said buffer, and generating the event video sequence by combining said pre-event sequence and a post-event sequence of image frames, said post-event sequence having a second GOP structure, which is different from said first GOP structure. In this manner, it is possible to use a variable GOP structure for, e.g., controlling output bit rate, while at the same time ensuring that a useful pre-event video sequence of a desired length of time may be included in the event video sequence. Thus, a predetermined GOP structure is used for the pre-event sequence, whereas another GOP structure is used for the post-event sequence.

The first GOP structure may differ from the second GOP structure in that a first GOP length of the first GOP structure differs from a second GOP length of the second GOP structure, each GOP length being defined by a number of frames contained in a respective group of pictures.

The second GOP length may be longer than said first GOP length. For instance, a user may set a GOP length to be used, which is too long for an entire group of pictures to fit in the pre-event buffer. A shorter GOP length may in such case be used for the pre-event sequence.

The first GOP length may be predetermined, and the second GOP length may be dynamic. This may be useful if output bit rate is controlled by varying the GOP length. A predetermined, static GOP length that will fit in the pre-event buffer may be used for the pre-event sequence in order to ensure that a viewable pre-event sequence of sufficient length may be provided.

According to variants of the method, the dynamic GOP length is set based on at least one of a level of motion determined for one or more input image frames, a noise level of one or more input image frames, a frame rate at which said input image frames are encoded, or a bit rate limit set for encoding said image frames. For instance, if there is a high level of motion in the image frames, the GOP length may be decreased in order to provide high quality images. Further, if the noise level is high, which may erroneously be perceived as a high level of motion, the GOP length may be increased for reducing output bit rate.

The predetermined GOP structure may be set by user input.

According to a second aspect, the abovementioned objects are achieved, in full or at least in part, by a for generating an event video sequence, said system comprising an image receiver arranged to receive input image frames encoded into a sequence of image frames arranged in groups of pictures, each group of pictures comprising an intra-frame and zero or more subsequent inter-frames, each group of pictures in said sequence of image frames having a GOP structure, a buffer arranged to store a pre-event sequence of image frames on a first-in-first-out basis, said pre-event sequence having a first predetermined GOP structure, an event notification receiver arranged to receive event notifications, a generating module arranged to retrieve the pre-event sequence from said buffer, and to combine it with a post-event sequence of image frames upon receipt of an event notification, said post-event sequence having a second GOP structure, which is different from said first GOP structure. With such a system, it is possible to generate event video sequences comprising a pre-event video sequence of a desired length of time, and still take advantage of a variable or dynamic GOP structure.

In an embodiment of the system, the first GOP structure differs from the second GOP structure in that a first GOP length of said first GOP structure differs from a second GOP length of said second GOP structure, each GOP length being defined by a number of frames contained in a respective group of pictures.

The second GOP length may be longer than the first GOP length. This makes it possible to use, e.g., a long GOP length for the post-event sequence in order to reduce output bit rate, even if that long GOP length is too long for the pre-event buffer.

The first GOP length may be predetermined, and said second GOP length is dynamic. Thus, the first GOP length may be preprogrammed or set by a user, and the second GOP length may be varied depending on, e.g., changes in the monitored scene.

According to an embodiment, the system further comprises a GOP length module arranged to set said dynamic GOP length based on at least one of a level of motion determined for one or more input image frames, a noise level of one or more input image frames, a frame rate at which said input image frames are encoded, or a bit rate limit set for encoding said image frames. This may, e.g., enable bit rate savings.

The system may further comprise a user input module arranged to receive user input for setting said predetermined GOP length. Thereby, the user may set the GOP length to be used for the pre-event buffer.

According to a third aspect, the abovementioned objects are achieved, in full or at least in part, by a camera comprising a system according to the second aspect. The camera may generally be embodied in the same ways as the system, with accompanying advantages.

According to a fourth aspect, the abovementioned objects are achieved, in full or at least in part, by a computer program product comprising a computer-readable storage medium with instructions adapted to carry out the method according to the first aspect when executed by a processor. The processor may be any type of device having processing capability, e.g., a central processing unit (CPU), a graphics processing unit (GPU), a custom made processing device implemented in an integrated circuit, an ASIC, an FPGA, or logical circuitry including discrete components.

As used herein, the term "event" is to be interpreted broadly. Thus, an event may, e.g., be an alarm event, generated by a video analysis algorithm, such as a motion detection algorithm, or generated by an external device, such as a door contact or a PIR sensor; a system event generated by a camera system, such as an error notification; or a user input event, such as an input of a command.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
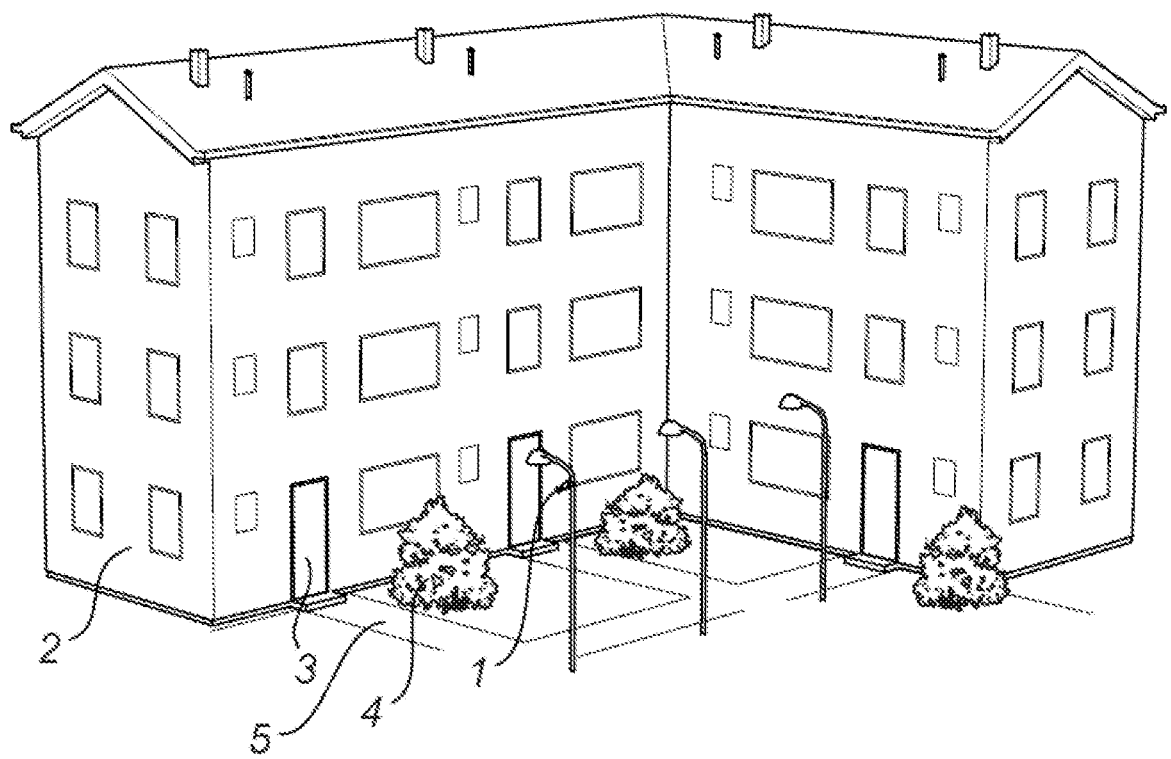
FIG. 1 is a view of scene that is monitored by a camera.

In FIG. 1, a scene is shown, which is monitored by a camera 1. In the scene, there is a building 2 with a door 3. The camera 1 is in this example used for monitoring an area in front of the door 3, particularly for movement of people near the door 3.

The camera 1 captures images of the scene, and a video motion detection algorithm is performed on the captured images. The camera 1 is set up to record video based on events from the motion detection algorithm. Via a graphical user interface the user may define a region of interest in images of the scene in which the motion detection algorithm is to be performed. For instance, the user may be interested only in motion only in front of the door 3, such as on the path 5, but not in swaying movements of the bush 4. Thus, the user may define a region of interest that covers the desired area in front of the door 3, but not the bush 4.

In order to be able to include a pre-event video sequence in recordings, the camera 1 has a FIFO buffer (12 in FIG. 5), which will be discussed further below in connection with FIGS. 4 and 5. When the motion detection algorithm determines that there is motion in the region of interest an event is generated. This event triggers recording of captured images and also of the images that are in the buffer at the time of the event. Recording then continues until the motion detection algorithm no longer detects motion within the region of interest. In order to record also a video sequence of the scene after the event, such that the user may see what happened after a person left the region of interest, an additional post-event recording time may be set, such that recording continues that additional time after the motion detection event has stopped detecting motion in the region of interest. In addition to, or instead of, recording the event video sequence, the camera may transmit the event video sequence to a site of use, such as a security control center, where the event video sequence may be viewed and/or recorded.

Figure 2:
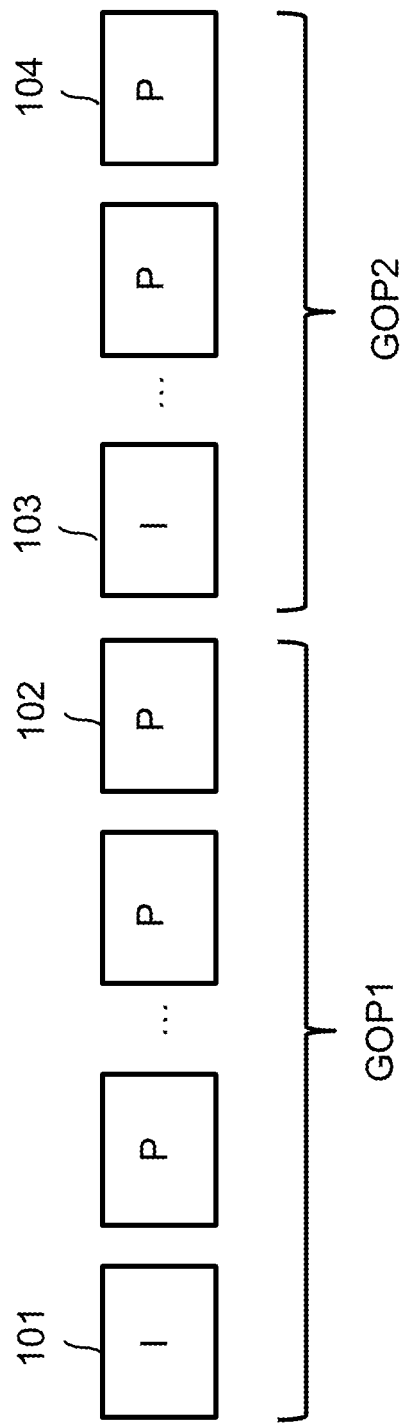
FIG. 2 is an illustration of an encoded sequence of image frames.

Before the event video sequence may be recorded or transmitted, it is encoded using a block-based hybrid video codec, such as an h.264 codec. As discussed above, the images are encoded as I-frames or P-frames, and these are grouped in groups of pictures, also referred to as GOPs. FIG. 2 illustrates an encoded sequence of image frames arranged in two groups of pictures GOP1 and GOP2. The first group of pictures GOP1 starts with an I-frame 101, which is followed by a number of P-frames. The first group of pictures ends with a P-frame 102. The next frame is encoded as an I-frame 103, which forms the start of a second group of pictures GOP2. After this I-frame 103, the following image frames are encoded as P-frames, and the second group of pictures is ended by a P-frame 104.

Figure 3:
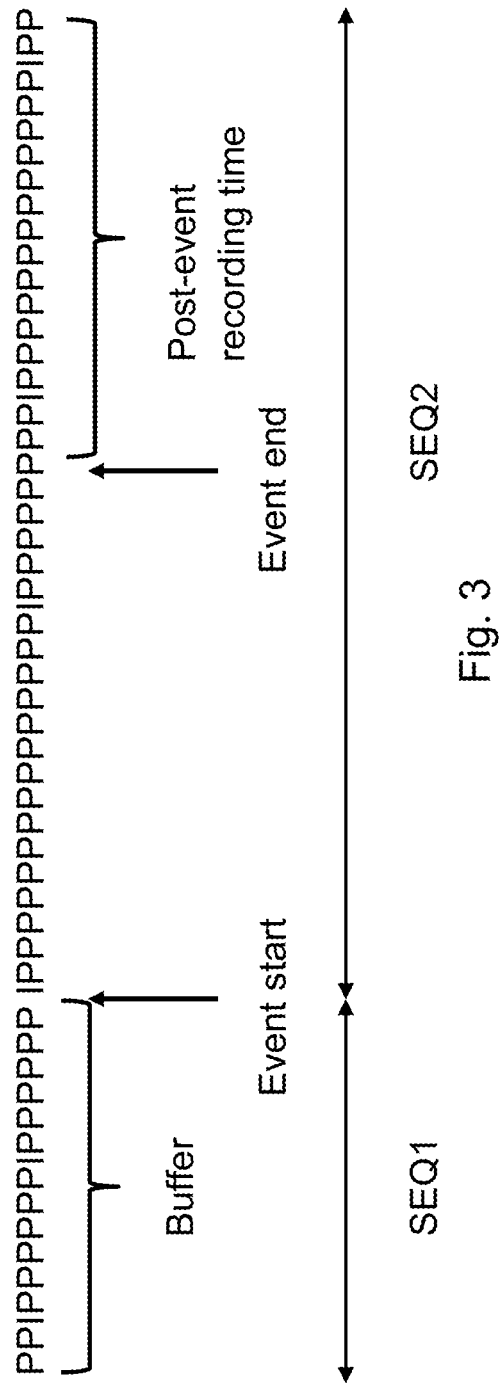
FIG. 3 is an illustration of an event video sequence.

Reference may now be made to FIG. 3, which illustrates an example of how an event video sequence is generated. Here, the image frames are indicated by an I for I-frames and by a P for P-frames. The camera 1 continuously stores captured image frames in the buffer (indicated by reference number 12 in FIG. 5). The buffer is a FIFO buffer, such that when the buffer is full, the oldest image frame in the buffer is overwritten with the latest captured image frame. The user has set a pre-event recording time of, e.g., 3 seconds. For these 3 seconds to be decodable and viewable, the pre-event video sequence has to start with an I-frame. However, it may very well happen that the first image frame in those 3 seconds is a P-frame, and decoding cannot start at a P-frame, since the P-frame itself does not contain all necessary data without the I-frame with reference to which the P-frame was encoded. In order to guarantee that there will be at least 3 seconds of pre-event video, a further time is added to the pre-event buffer, corresponding to one group of pictures. The actual length of the pre-event buffer will therefore depend on the pre-event time chosen by the user, and on the current frame rate and GOP length. For instance, with a user set pre-event time of 3 seconds, a frame rate of 30 fps and a GOP length of 128, the total time stored in the pre-event buffer would be 7.3 seconds.

When a person enters the monitored scene, the motion detection algorithm determines that there is motion in the region of interest and an event is triggered. Upon notification of this event, the image frames that are currently in the pre-event buffer are recorded, and recording of image frames captured beginning at the event is started. When the motion detection algorithm no longer detects motion in the region of interest, recording is continued until the end of a post-event recording time set by the user. The post-event recording time may be, e.g., 5 seconds.

In order to control bit rate, it is desired to use a dynamic GOP length for the recordings. In this manner, a long GOP length may be used when there is little or no motion in the scene, thereby reducing the output bit rate, since P-frames generally require less bits for encoding than I-frames. When there is a lot of motion in the scene, shorter GOP lengths may be used, leading to higher output bit rate, but also reducing encoding artifacts. As already mentioned, this makes it difficult, or even impossible to determine a pre-event buffer length that ensures that a desired pre-event time may be decoded and viewed. Once again using the example with 3 seconds set by the user as pre-event recording time and a frame rate of 30 fps, but with an increased GOP length of 256, the pre-event buffer would have to hold 11.3 seconds worth of pre-event video. If only the previously calculated 7.3 seconds of video were stored in the pre-event buffer, there is great risk that there will not be an I-frame at or before the start of the desired 3 seconds of pre-event recording. It may be pointed out that, with this combination of frame rate and GOP length, a group of pictures is longer than the 3 seconds set by the user as pre-event recording time.

According to the invention, this is solved by using another GOP structure for the buffer, in this example another GOP length. If a predetermined GOP length is used for the buffer, the necessary length of the buffer may be predictably calculated as described above. In FIG. 3, the pre-event sequence is indicated by the reference SEQ1. Once the motion detection event is triggered, the pre-event video sequence SEQ1 present in the buffer is retrieved and recorded, and recording of image frames as they are captured is started. The post-event sequence is indicated by the reference SEQ2 and includes image frames captured during the event, i.e. from the start of the event to the end of the event, and image frames captured during the set post-event recording time. In contrast to the pre-event sequence, for the video sequence starting at the event, a dynamic GOP length is used, as indicated by a varying number of P-frames after each I-frame in FIG. 3. Here, the dynamic GOP length is controlled based on a level of motion in the image frames. Such dynamic GOP length control may be performed in many ways, e.g., in a manner disclosed in Applicant's European patent application No. 14193291.3, and will not be discussed in further detail here.

It may be noted that, although the discussion above has referred to recording of the event video sequence, the same principle of generating an event video sequence is useful for other purposes, such as for displaying the event video sequence, e.g. to a security guard in a control center. It is also useful for transmitting the event video sequence, e.g., via e-mail or ftp.

Figure 4:
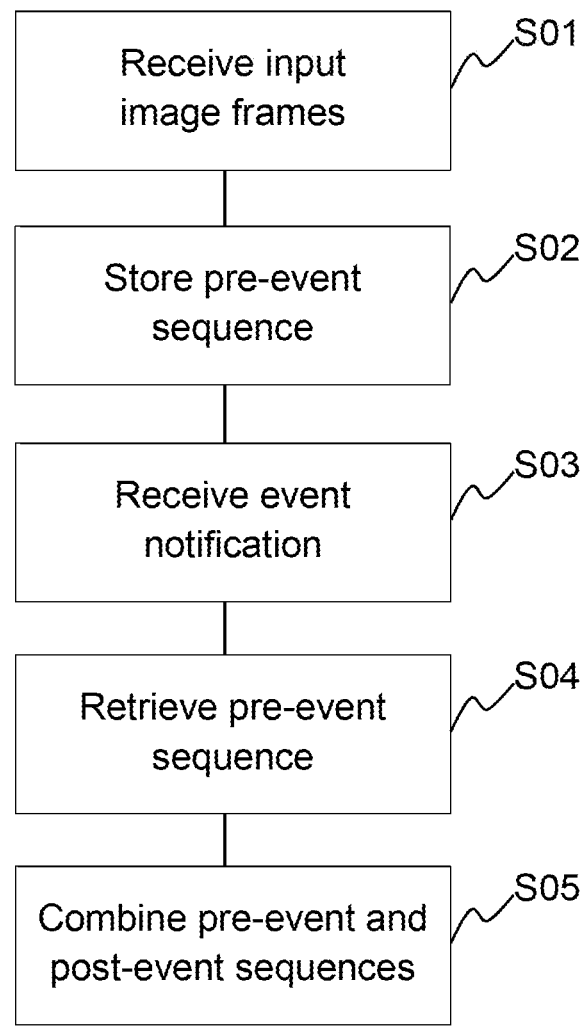
FIG. 4 is a flow chart of a method of generating an event video sequence.

The method of generating an event video sequence may be described in more general terms with reference to FIG. 4, which is a flow diagram of a variant of the method. Input image frames are received (step S01). The input image frames are encoded into a sequence of image frames arranged in groups of pictures. Each group of pictures has a GOP structure defining, e.g., the types of frames used (e.g., I-frames and P-frames and/or B-frames) and the number of frames per group of pictures, i.e. the GOP length. A pre-event sequence of image frames is stored (step S02) in a FIFO buffer. The pre-event sequence has a first predetermined GOP structure. An event notification or trigger is received (S03). When the event notification has been received, the pre-event sequence is retrieved from the buffer (step S04). The event video sequence is generated by combining the pre-event sequence and a post-event sequence of image frames. The post-event sequence of image frames is captured starting at the time of the event and has a second GOP structure, which is different from the first GOP structure. The first and second GOP structure may vary in several ways, e.g., by having different GOP lengths. The generated event video sequence may be used in various ways, such as for recording, displaying or transmitting. The method may be performed by means of a computer program.

A system that may be used in accordance with the method described above will now be described with reference to FIG. 5. The system 10 for generating an event video sequence comprises an image receiver 11 arranged to receive input image frames encoded into a sequence of image frames arranged in groups of pictures. The system 10 further comprises a FIFO buffer 12 for storing a pre-event sequence of image frames, the pre-event sequence having the first predetermined GOP structure. Additionally, the system 10 has an event notification receiver 13, which is arranged to receive event notifications. The system 10 also has a generating module 14 arranged to retrieve the pre-event sequence from the buffer 12, and to combine it with a post-event sequence of image frames upon receipt of an event notification. The post-event sequence has a second GOP structure that differs from the first GOP structure. In this embodiment, the system 10 includes a GOP length module, which is arranged to set a dynamic GOP length for the post-event sequence. The dynamic GOP length may be based on, e.g., a level of motion in the input image frames. Further, the system 10 may comprise a user input module 16, which is arranged to receive user input for setting a predetermined GOP length for the pre-event sequence. The user may, e.g., input a desired GOP length via a graphical user interface of the system 10.

It will be appreciated that a person skilled in the art can modify the above described embodiments in many ways and still use the advantages of the invention as shown in the embodiments above. As an example, it may be noted that in the description above, only P-frames are used as interframes. However, B-frames may also be used.

As already mentioned, the generation of the event video sequence may be performed for various reasons, such as for recording, as discussed above, or for displaying or transmitting, e.g., via e-mail or ftp.

The system 10 for generating an event video sequence may be integrated in a camera, such as the monitoring camera 1 shown in FIG. 1. The system 10 may also be embodied separately, but operatively connected to a camera.

The dynamic GOP length is in the example above based on level of motion. However, the GOP length of the post-event sequence may be varied also using other schemes. The dynamic control of the GOP length may be based on a noise level of one or more input image frames, a frame rate at which said input image frames are encoded, or a bit rate limit set for encoding said image frames.

Further, an I-frame may need to be inserted after a loss of network connection for ensuring a new starting point for decoding.

Additionally or alternatively, the user may have set a GOP length to be used for recordings, which is too long for the available pre-event buffer. A shorter GOP length that fits in the buffer may in such case be used for the pre-event sequence, whereas the longer GOP length set by the user is used for the post-event sequence.

The second GOP structure may differ from the first GOP structure in alternative or additional ways than just differences in GOP length. Just as an example, the first GOP structure may be made up of I-frames, P-frames and B-frames, and the second GOP structure may be made up of only I-frames and P-frames.

In addition to changes in GOP structure, there may be other encoding differences between the pre-event sequence and the post-event sequence. For example, one compression value may be used for the pre-event sequence, and another compression value for the post-event sequence. Alternatively, a static compression value may be used for the pre-event sequence, and a dynamically controlled compression value may be used for the post-event sequence.

In the example described above the event is a motion detection event. It should be appreciated that the method may be used equally well with events from other video analysis algorithms, such as an object tracking algorithm, a cross-line detection algorithm, a wrong way detection algorithm, a face detection algorithm, or a license plate recognition algorithm. The event may also be of other alarm event types, e.g., originating from an external sensor, such as a microphone, a door contact or a PIR sensor. Such devices may be integrated in the camera, connected to the camera via an I/O port, or separate. Separate devices may submit event notifications to the system or to the camera, e.g., via an Ethernet connection.

The event need not be an alarm event, but may be a system event or a user input event. A system event may be generated by a camera system, and may be an error notification, such as a network loss notification. A user event may be an input of a command, such as a manual start of recording.

Figure 5:
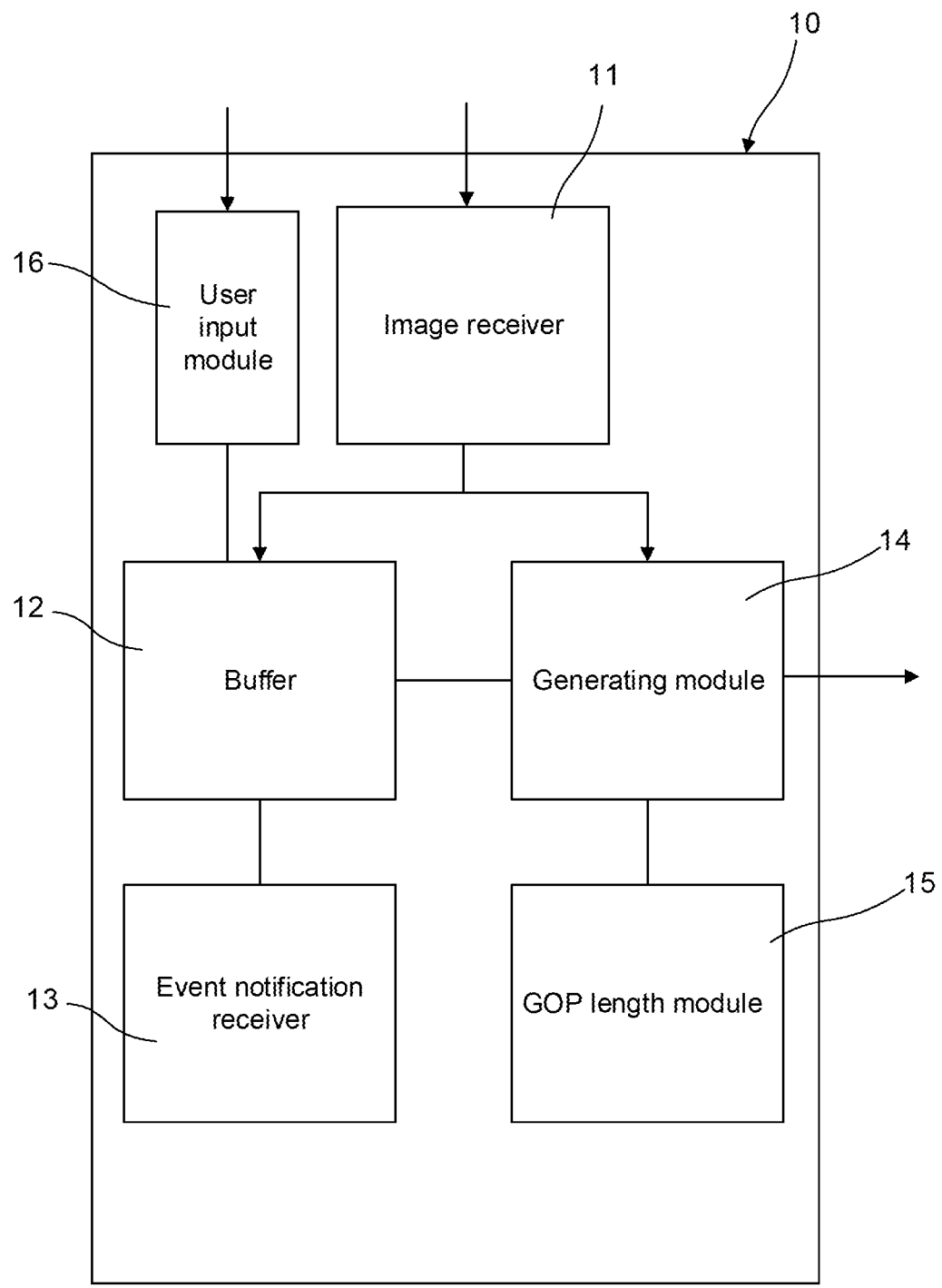
FIG. 5 is a block diagram of a system for generating an event video sequence.

In the embodiment shown in FIG. 5, the system has only one buffer. However, the system may be provided with more buffers and the method may use more buffers. For instance, the system and method may be operable with more than one kind of event, and may have one buffer for each such event, e.g., one buffer for motion detection, one buffer for face detection, one buffer for system events, and one buffer for user events. In this manner, each available kind of event may initiate generation of its own event video sequence. For example, generation of a first event video sequence may be initiated by detection of motion in the monitored scene, such that display of the first video sequence is made to an operator in a control center when a person enters the scene. If the person then tampers with the camera by cutting connection to the network, a system event may initiate generation of a second event video sequence, which may be stored locally in the camera, e.g., on an onboard SD card.

A camera from which the input image frames may originate may be any kind of camera, such as a camera employing visible light, an IR camera or a thermal camera. The camera may be a monitoring camera.

The input image frames may generally be generated by a visual light sensor, a thermal sensor, a time-of-flight sensor, or other types of image generating sensors capable of generating information to be encoded using intra-frame and inter-frame encoding technologies.

The encoder used for encoding the image frames may be any kind of block-based hybrid video codec. The encoder may be integrated in the event video sequence generating system or may be a separate device or module operatively connected to the event video sequence generating system.

The system may be embodied as software, firmware or hardware, or a combination thereof.

Thus, the invention should not be limited to the shown embodiments but should only be defined by the appended claims.

What is claimed is:

1. A method of generating an event video sequence, the method comprising:
   receiving input image frames encoded into a sequence of image frames arranged in groups of pictures, each group of pictures comprising an intra-frame and zero or more subsequent inter-frames, each group of pictures in said sequence of image frames having a group of pictures (GOP) structure;
   storing a pre-event sequence of image frames in a first-in-first-out buffer, said pre-event sequence having a first GOP structure;
   receiving an event notification; upon receiving said event notification, retrieving said pre-event sequence from said buffer; and
   generating the event video sequence by combining said pre-event sequence and a post-event sequence of image frames, said post-event sequence having a second GOP structure, which is different from said first GOP structure, wherein the generated event video sequence only includes data from the pre-event sequence of image frames and the post-event sequence of image frames, wherein said first GOP structure differs from said second GOP structure in that a first GOP length of said first GOP structure differs from a second GOP length of said second GOP structure, each GOP length being defined by a number of frames contained in a respective group of pictures, and wherein said first GOP length is set by user input and is used to determine the length of the pre-event sequence, and said second GOP length is dynamic.

2. The method according to claim 1, wherein said second GOP length is longer than said first GOP length.

3. The method according to claim 1, wherein said dynamic GOP length is set based on at least one of a level of motion determined for one or more input image frames, a noise level of one or more input image frames, a frame rate at which said input image frames are encoded, or a bit rate limit set for encoding said image frames.

4. A system for generating an event video sequence, said system comprising:
   an image receiving circuit arranged to receive input image frames encoded into a sequence of image frames arranged in groups of pictures, each group of pictures comprising an intra-frame and zero or more subsequent inter-frames, each group of pictures in said sequence of image frames having a group of pictures (GOP) structure, wherein the input image frames originate from a camera;
   a buffer arranged to store a pre-event sequence of the received image frames on a first-in-first-out basis, said pre-event sequence having a first GOP structure;
   a processor arranged to receive event notifications, retrieve the pre-event sequence from said buffer, and generate the event video sequence by combining the pre-event sequence with a post-event sequence of image frames upon receipt of an event notification, said post-event sequence having a second GOP structure, which is different from said first GOP structure, wherein the generated event video sequence only includes data from the pre-event sequence of image frames and the post-event sequence of image frames, wherein said first GOP structure differs from said second GOP structure in that a first GOP length of said first GOP structure differs from a second GOP length of said second GOP structure, each GOP length being defined by a number of frames contained in a respective group of pictures, and wherein said first GOP length is set by user input and is used to determine the length of the pre-event sequence, and said second GOP length is dynamic; and
   a graphical user interface arranged to receive the user input for setting said first GOP length.

5. The system according to claim 4, wherein said second GOP length is longer than said first GOP length.

6. The system according to claim 4, wherein the processor is further arranged to set said dynamic GOP length based on at least one of a level of motion determined for one or more input image frames, a noise level of one or more input image frames, a frame rate at which said input image frames are encoded, or a bit rate limit set for encoding said image frames.

7. The system according to claim 4, wherein the system is found in a camera.

8. An article of manufacture including a non-transitory computer-readable storage medium having instructions stored thereon, that when executed by a processor cause a computing device to execute instructions, the instructions causing the computing device to perform operations comprising:

receiving input image frames encoded into a sequence of image frames arranged in groups of pictures, each group of pictures comprising an intra-frame and zero or more subsequent inter-frames, each group of pictures in said sequence of image frames having a group of pictures (GOP) structure;

storing a pre-event sequence of image frames in a first-in-first-out buffer, said pre-event sequence having a first GOP structure;

receiving an event notification; upon receiving said event notification, retrieving said pre-event sequence from said buffer; and generating the event video sequence by combining said pre-event sequence and a post-event sequence of image frames, said post-event sequence having a second GOP structure, which is different from said first GOP structure, wherein the generated event video sequence only includes data from the pre-event sequence of image frames and the post-event sequence of image frames, wherein said first GOP structure differs from said second GOP structure in that a first GOP length of said first GOP structure differs from a second GOP length of said second GOP structure, each GOP length being defined by a number of frames contained in a respective group of pictures, and wherein said first GOP length is set by user input and is used to determine the length of the pre-event sequence, and said second GOP length is dynamic.

\* \* \* \* \*